United States Patent
Takeuchi et al.

(10) Patent No.: US 6,321,360 B1
(45) Date of Patent: Nov. 20, 2001

(54) SYSTEM INCLUDING A FERROELECTRIC MEMORY

(75) Inventors: Kan Takeuchi, Kokubunji; Hiroyuki Tanikawa, Kodaira, both of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/580,180

(22) Filed: May 26, 2000

Related U.S. Application Data (63) Continuation of application No. 08/932,957, filed on Sep. 18, 1997, now Pat. No. 6,131,177.

(30) Foreign Application Priority Data

Sep. 24, 1996 (JP) .................................................. 8-251262

(51) Int. Cl.$^7$ ................................................. G11C 29/00
(52) U.S. Cl. ........................................................ 714/766
(58) Field of Search ................................. 714/767, 768, 714/763; 365/145, 195, 201; 711/163

(56) References Cited

U.S. PATENT DOCUMENTS

| | | | |
|---|---|---|---|
| 4,688,219 | 8/1987 | Takemae | 714/711 |
| 5,172,339 | 12/1992 | Noguchi et al. | 365/201 |
| 5,359,569 | 10/1994 | Fujitai et al. | 365/229 |
| 5,629,888 | 5/1997 | Saito et al. | 365/145 |
| 5,754,753 | 5/1998 | Smelser | 714/763 |
| 5,758,056 | 5/1998 | Barr | 714/7 |
| 5,818,771 | 10/1998 | Yasu et al. | 365/195 |

FOREIGN PATENT DOCUMENTS 8-31196   2/1996   (JP).

OTHER PUBLICATIONS

IEEE International Solid–State Circuits Conference, Digest of Technical Papers, 1994, pp. 268–269.
Symposium on VLSI Technology, Digest of Technical Papers, 1990, pp. 15–16.
IEEE International Solid–State Circuits Conference, Digest of Technical Papers, 1987, pp. 22–23.

*Primary Examiner*—Albert Decady
*Assistant Examiner*—Shelly A Chase
(74) *Attorney, Agent, or Firm*—Mattingly, Stanger & Malur, P.C.

(57) ABSTRACT

A system with a ferroelectric memory has a low probability of soft error thereby decreasing the possibility of serious damage to the system that might result from soft errors. The ferroelectric memory is provided with an overwrite-inhibited memory block 122 for storing this OS (Operating System) and applications, and an overwrite-free memory block 123 which is a work area. The overwrite-inhibited memory block 122 includes a parity bit storage 125. A process for checking and correcting error performed about one a day. A command for starting the error checking and correcting procedures is triggered by a switch such as power source switch. When an error occurs in the ferroelectric memory 120, it is possible to recover the function of the system.

14 Claims, 9 Drawing Sheets

SYSTEM INCLUDING A FERROELECTRIC MEMORY

This is a continuation application of U.S. Ser. No. 08/932,957, now U.S. Pat. No. 6,131,177 filed Sep. 18, 1997.

FIELD OF THE INVENTION

The present invention relates to a system including a nonvolatile semiconductor memory which uses a ferroelectric material. More specifically, the invention relates to a system including a ferroelectric memory that decreases the probability of erroneous operation of the memory.

BACKGROUND OF THE INVENTION

A memory using a ferroelectric material, e.g., a ferroelectric random access memory (FERAM) is a nonvolatile memory which stores data based upon the direction of polarization of the ferroelectric material. In a ferroelectric memory, for example, a memory cell includes a ferroelectric capacitor and a switching transistor. The stored data is read out by applying a voltage to the ferroelectric capacitor in such a manner that the polarization is oriented in one direction and by determining whether the polarization at this moment is inverted or not. Such a ferroelectric memory is disclosed in, for example, IEEE International Solid-State Circuits Conference, DIGEST OF TECHNICAL PAPERS, 1994, pp. 268–269.

In ordinary operation, on the other hand, the ferroelectric memory may be used as a dynamic random access memory (DRAM) by fixing a plate potential of the ferroelectric capacitor to, for example, a power source voltage. When the power source is turned off, however, the operation is performed, in which the data of the stored potential is converted into data of the direction of polarization of the ferroelectric material. This makes it possible to hold the data even after the power source is turned off. Such a ferroelectric memory is disclosed in, for example, Symposium on VLSI Technology, DIGEST OF TECHNICAL PAPERS, 1990, pp. 15–16.

SUMMARY OF THE INVENTION

In an ordinary DRAM, it is generally known that erroneous operation results from the stored data being inverted by a noise charge that is generated by radioactive rays. It is considered that such a stored data inversion phenomenon also takes place with a ferroelectric memory when it is operated as an ordinary DRAM. For a ferroelectric memory system that detects the direction of polarization, the polarization is oriented in one direction when the data is to be read out and the polarization data then extinguishes. Therefore, the polarization data must be written again based upon the data that is read out before the operation for reading the data is finished. When the data is incorrectly read out due to noise, the polarization is incorrectly written again, too. In such a case, the error is called a soft error, i.e., an error caused by erroneous inversion of the stored data due to radioactive rays or noise. It is called a soft error because the function of the memory cell has not been lost.

A soft error in a ferroelectric memory may trigger a serious problem compared to that of the case of a DRAM for the following reasons.

In case the system has halted due to the occurrence of an error in the data stored in the memory such as a DRAM, the system can at least be restarted. In many cases, however, the data which is sorted in a nonvolatile memory such as a ferroelectric memory is used repetitively, for example, in an OS (operating system) of the system. For portable electronic components, in particular, if the OS of the system or the application program is stored in a ferroelectric memory, then, there is no need of using a large nonvolatile storage medium such as hard disk. Accordingly, a compact system can be built. Furthermore, the CPU can access the ferroelectric memory at speeds higher than those of accessing the hard disk and, hence, the start time of the portable electronic components can be significantly decreased.

In a system including such a ferroelectric memory, if a soft error occurs even once in the ferroelectric memory, erroneous data is written again generating the potential for a serious defect in the functions of the system and often triggering a shut down of the system. To recover the system in such a case, the correct data of the OS, for example, must be written again into the ferroelectric memory, usually by connection to an external nonvolatile storage medium such as a hard disk. This is quite inconvenient for portable electronic components that are used in a variety of places such the function of the system remains halted until the nonvolatile storage medium such as a hard disk is obtained and connected.

In order to avoid soft errors in the DRAM, a method has been employed to automatically detect and correct soft errors by providing an error checking and correcting circuit (ECC circuit). In a large-scale system such as large computer, the ECC circuit can be provided in a chip separate from the main body. In a small-scale system such as a portable electronic component or a personal computer, however, it is desirable that the DRAM chip itself is provided with an error checking and correcting function to make the system compact. A DRAM chip having an error checking and correcting function has been disclosed in IEEE International Solid-State Circuits Conference, DIGEST OF TECHNICAL PAPERS, 1987, pp. 22–23.

Figure 8A:
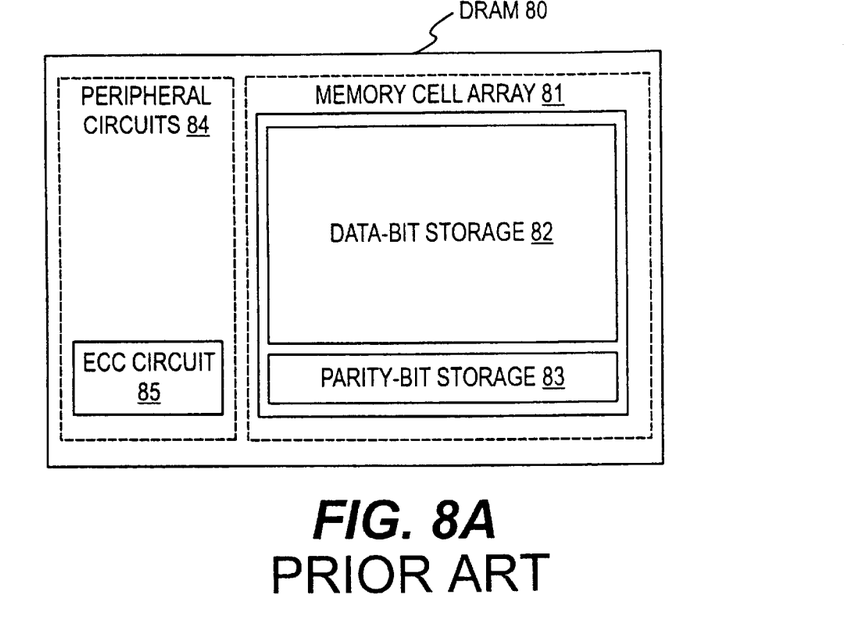
FIGS. 8A and 8B are diagrams of a conventional DRAM system including an ECC circuit.
Figure 8B:
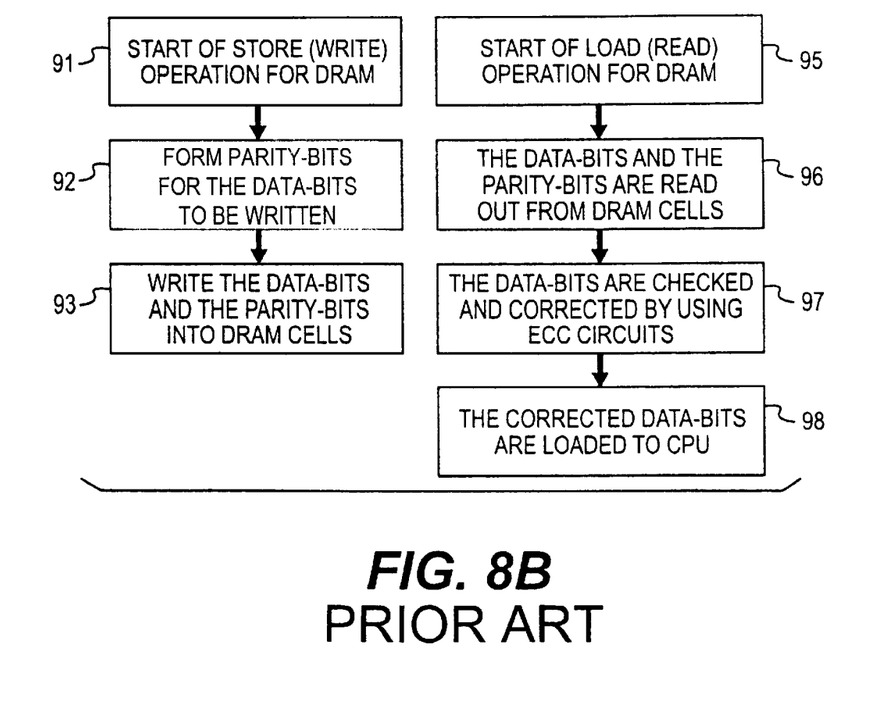

Reference is made to the prior art diagrams of FIGS. 8A and 8B. In particular, FIG. 8A is a diagram showing a fundamental constitution of a DRAM mounting an ECC circuit and the diagram of FIG. 8B is a flow chart of the writing/reading operations.

FIG. 8A shows a DRAM 80 that has a memory cell array 81 and a peripheral circuit portion 84. The data stored in the memory cell array 81 can be classified into two types, i.e., data storage bits 82 for storing data and parity bits 83. The peripheral circuit portion 84 includes an ECC circuit 85.

When the data are to be written (step 91) as shown in the flow chart of the diagram FIG. 3B, the parity bit data are formed (step 92), and the data storage bits and parity bits are written into the DRAM 80 (step 93). To read the data (step 95), first, a plurality of data storage bits and corresponding parity bits are read out (step 96). Relying upon t6he results of the operation for these data, the ECC circuit 85 determines whether or not an error has occurred for any bit and for any bit in which the error has occurred, corrects the data (step 97), and sends the data from the DRAM to the CPU (step 98). Thus, there is realized a DRAM which does not erroneously operate for the CPU.

In a conventional DRAM having an ECC circuit incorporated in the chip, however, (1) the writing speed decreases since a parity bit must be formed for each writing, (2) the reading speed decreases since the parity bit must be read together with the stored data and the ECC checking must be executed to correct error for each reading, and (3) the chip size increases by the area of the ECC circuit resulting in an increase in the cost of the chip. Accordingly, almost none of the DRAMs that have been placed on the market incorporate an ECC. This results from the consideration of achieving a balance between the potential for damaging the system in the case of soft error in the DRAM, the frequency of occurrence of soft error and the extent to which the above-mentioned drawbacks affect the DRAM when an ECC circuit is incorporated in the chip.

In the ferroelectric memory, on the other hand, it is expected that soft errors may cause a more serious type of damage to the system on account of the reasons described above. Further, when an ECC circuit is mounted as on the DRAM chip to prevent soft errors from occurring, problems arise with respect to the operation speed, which decreases. Also the cost of the chip increases when the memory is fabricated with an ECC.

An object of the present invention is to provide a system including a ferroelectric memory, which has a low probability of causing serious damage to the system that may result from a soft error in the ferroelectric memory. It is also an object of the invention to provide a system including a ferroelectric memory that does not cause the operation speed to decrease and does not increase the cost of the chip, as a result of solving the above-mentioned problems.

(a) In order to accomplish the above-mentioned objects according to the present invention, a system having a ferroelectric memory in which a plurality of memory cells including a ferroelectric capacitor and a field-effect transistor are arranged in the form of a matrix, and a CPU is connected to the ferroelectric memory, wherein the storage area of the ferroelectric memory includes an overwrite-inhibited memory block and an overwrite-free memory block. The overwrite-inhibited memory block has an area (data bit storage 124) for storing ordinary data and an area (parity bit storage) for storing additional parity information for correcting errors in the case errors have occurred in the ordinary data. The system further has an error checking and correcting (ECC) means circuit for correcting errors in the data that have occurred in the overwrite-inhibited memory block. Furthermore, the error checking and correcting (ECC) is achieved by having at least a CPU which accesses a storage area which stores a program regarding error checking and correcting procedures, and a control circuit for temporarily enabling data to be written into the overwrite-inhibited memory block.

(b) Moreover, said overwrite-inhibited memory block is used as an area for storing an OS program and application programs of the system, and said overwrite-free memory block is used as a storage area (work area) which is temporarily needed for the CPU to execute the operation based upon said application programs.

(c) The signal for starting the operation for checking and correcting error by said error checking and correcting means, is generated when a user turns on a switch provided on the system. Furthermore, the switch is used for turning the power source of the system on.

(d) The storage area which stores a program regarding error checking and correcting procedures is provided in a ROM in said CPU, or the two same sets of said storage area are provided in said overwrite-inhibited memory block.

(e) The storage area in said ferroelectric memory is divided into a plurality of blocks, said overwrite-inhibited memory block and said overwrite-free memory block are formed for each of said blocks as a unit, and the data are temporarily enabled to be written into the overwrite-inhibited memory block with said block as a unit.

Furthermore, the number of said overwrite-inhibited memory blocks is an even number, said control circuit rejects all write instructions of the first time to the overwrite-inhibited memory blocks, and when a write instruction is given to any memory cell in a block between a set of two blocks, the data is enabled to be written into any memory cell in the other block of said set of two blocks only for a predetermined period of time.

DETAILED DESCRIPTION OF THE PREFERRED EMBODIMENTS

As an embodiment of the present invention, a system includes at least a CPU and a ferroelectric memory. The CPU accesses the storage area storing a program regarding error checking and correcting procedures. The storage area (memory cell array) of the ferroelectric memory is divided into an overwrite-inhibited memory block and an overwrite-free memory block. The overwrite-inhibited memory block stores an OS and application programs, and the overwrite-free memory block is used as a work area. The overwrite-inhibited memory block has a data bit storage area and a parity bit storage area. The data bit storage is used for storing ordinary data, and the parity bit storage is used for storing data (parity bits) for checking and correcting soft errors that has occur in the data of a data storage bit. The overwrite-free memory block is constituted by the data storage bits only. Usually, the data are inhibited from being written into the overwrite-inhibited memory block, and means which temporarily enables the writing, e.g., a control circuit is provided in the peripheral circuit portion.

In the system of the present invention, the CPU executes the processing for checking and correcting data in the overwrite-inhibited memory block upon receiving a command for starting the ECC procedures. The command for starting the ECC procedures is automatically formed by an internal circuit of the system when the power source of the system is turned on. Or, the command for starting the ECC procedures is generated as the user turns the switch of the system on. The storage area for storing the program for ECC procedures is provided in the ROM in the CPU. Or, the two same sets of the storage area regarding ECC procedures are provided in the overwrite-inhibited memory block in the ferroelectric memory.

An address storage unit for defining the range of the overwrite-inhibited memory block is provided in the peripheral circuit portion or in the overwrite-inhibited memory block in the memory cell array. The overwrite-inhibited memory block preferably has two memory mats that are opposed to each other with a row of sense amplifiers sandwiched therebetween. The control circuit enables the writing onto the other memory mat for only a predetermined period of time after a write instruction (which is not accepted) is given to any address of one of the two memory mats opposed to each other.

An embodiment of the present invention will now be described in detail with reference to the drawings.

Figure 1:
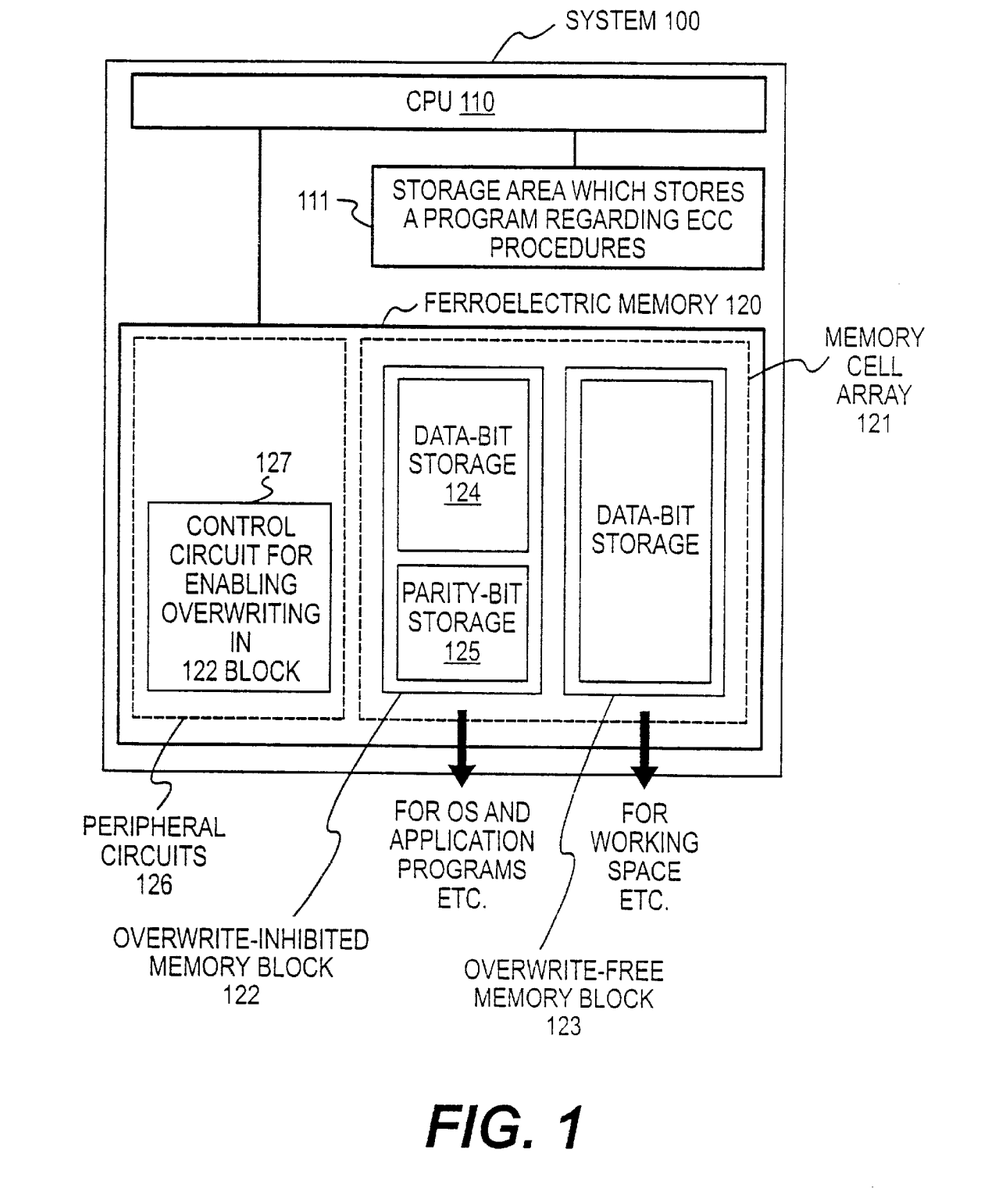
FIG. 1 is a diagram illustrating the basic arrangement of a system of the present invention.

FIG. 1 illustrates a basic arrangement of the system according to an embodiment of the present invention. The system 100 of this embodiment includes at least a CPU 110 and a ferroelectric memory 120. The storage area (memory cell array 121 of the ferroelectric memory 120) is divided into an overwrite-inhibited memory block 122 and an overwrite-free memory block 123. The overwrite-inhibited memory block 122 is used for storing data that is repetitively used in the system and that is rarely rewritten, such as OS and application programs of the system. The overwrite-free memory block 123 is used for temporarily storing the data that is frequently rewritten, i.e., it is used as a work area. The overwrite-inhibited memory block 122 is provided with an ordinary data bit storage area 124 as well as a parity bit storage area 125. The parity bit storage 125 stores the data for recovering data in case the data in the data bit storage area is inverted due to a soft error. For instance, parity bits consisting of eight memory cells are provided for the data bits consisting of 120 memory cells. Here, one of the eight memory cells of the parity bits stores "0" when there is an even number of data "1" in 127 memory cells from which the above memory cell is excluded, and stores a "1" when there is an odd number of data "1" in 127 memory cells from which the above memory cell is excluded. This memory cell holds data which indicates that an error has occurred in any one of the 128 memory cells.

That is, when the number of the data "1" in the 127 memory cells does not correspond to the data of the above memory cell, then, it means that an error has occurred. The remaining seven memory cells of the parity bits assume seventh power of two states, i.e., assume 128 different states. Error can be recovered by associating these states with the data in which the error occurred in any of the 128 memory cells. In the above-mentioned embodiment, errors that have occurred in two or more memory cells cannot be recovered. Such a case, however, happens very rarely. In the subsystem of the present invention as will be described later, therefore, the parity bits capable of repairing a single error are enough.

Figure 2:
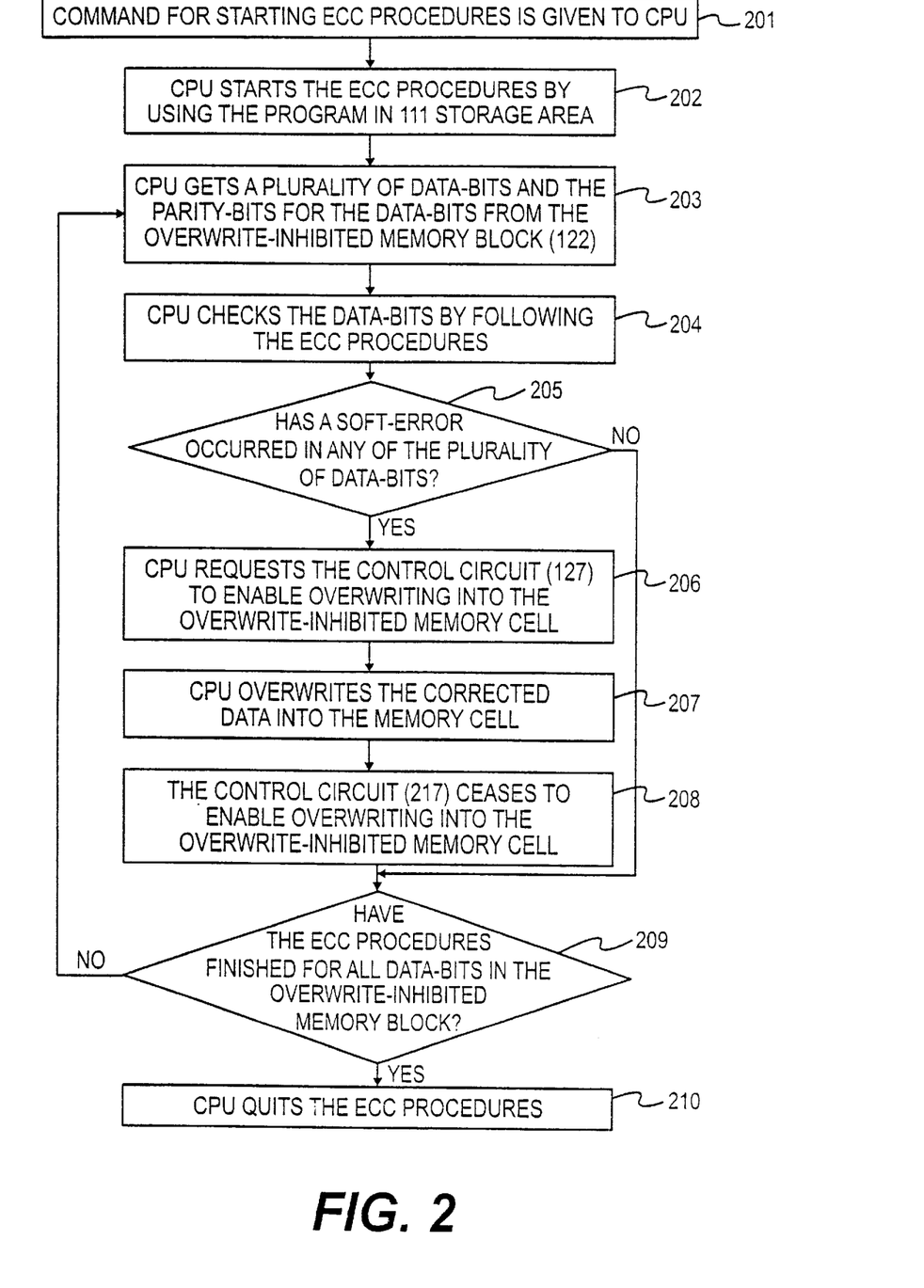
FIG. 2 is a flow chart of the process for checking and correcting error in the system of FIG. 1.

To recover data resulting from an error occurring in a memory cell, it is necessary to compare the results of operation for, for example, 120 data storage bits with the results of the parity bits, and determine the location of the error based on this comparison. This is done by the CPU 110 based on a program stored in the area 111 for storing a program regarding error checking and correcting procedures. When it becomes obvious that an error has occurred in a memory cell, correction data must be rewritten into the memory cell. A control circuit 127 for temporarily enabling the data to be written into the overwrite-inhibited memory block 122 is provided in the peripheral circuit portion 126 of the ferroelectric memory. FIG. 2 is a flow chart of a process for checking and correcting error in the system 100 of FIG. 1. First, a command for starting the processing for checking and correcting error is given to the CPU 100 (step 201).

Upon receiving this command, the CPU 110 starts the operation according to a program regarding error checking and correction procedures (step 202). The CPU 110 loads data (data of 120 memory cells in the above-mentioned embodiment) of a plurality of data storage bits of the overwrite-inhibited memory block 122 in the ferroelectric memory as well as data (data of eight memory cells in the above-mentioned embodiment) of the corresponding parity bits (step 203). Next, the CPU 110 checks the presence of error in the data that are loaded in compliance with a procedure instructed by the program (step 204).

When there is an error in the data (step 205: Y), the CPU 100 instructs the control circuit 127 in the ferroelectric memory to enable the data to be temporarily written to correct the data (step 206). The erroneous data is corrected according to procedure instructed by the program and the corrected data is overwritten into the ferroelectric memory (step 207). After the corrected data is overwritten into the memory cell, the control circuit 127 brings the memory cell again into the overwrite-inhibited state (step 208).

After the step 208, or when there is no error in the data (step 205: N), it is determined whether the correction processing is effected for all data in the overwrite-inhibited memory block or not. When there are data for which the correction processing has not yet been effected (step 209: N), the routine returns again to the step 203. When all of the data bits in the overwrite inhibited memory block have been subject to the correction processing (step 209: Y), the CPU 100 ends the error correction processing (step 210). As a result, the error correction processing is executed for all data in the overwrite-inhibited memory block according to the above-mentioned procedure.

An embodiment of a method for determining the parity bit and for correcting a bit error is described below for the case where eight parity bits are added to 120 data storage bits. First, identification numbers of from 1 to 128 are allocated to 120 data storage bits and to eight parity bits. Here, however, to the parity bits are allocated identification numbers of "n-th power of 2" (i.e., 1, 2, 4, 8, 16, 32, 64, 128). The identification numbers are virtual ones for simply identifying the bits but do not represent storage addresses in the ferroelectric memory. For instance, eight parity bits may be stored in the consecutive addresses.

Next, the data of seven parity bits of identification numbers "n-th power of 2" (n is 0 to 6) are determined by the following procedure. That is, the data of the parity bit of an identification number "n-th power of 2" is set to be "0" when the number of bits of the data "1" is an even number among 63 data storage bits in which the (n+1)-th digit is not 0 but is 1 with the identification numbers being expressed by the binary notation, and the data of the parity bit of an identification number of the "n-th power of 2" is set to be "1" when the number of the bits is an odd number. The data of a remaining parity bit (identification number 128, i.e., seventh power of 2) is determined as described below. That is, the data of the parity bit of the identification number 128 is set to be "0" when the number of bits of the data "1" is an even number among 120 data storage bits and the above seven parity bits, and is set to be "1" when it is an odd number.

By using the thus determined parity bits, a bit error is checked and corrected in a manner as described below. That is, the data of 120 data storage bits and eight parity bits are read out from the ferroelectric memory to check whether the seven parity bits of the identification numbers "n-th power of 2" (n is from 0 to 6) assume the above-mentioned predetermined value (which is determined from the data storage bits). Then, binary numerals of seven digits are formed with the (n+1)-th digit as 0 when the predetermined value has been assumed, or with the (n+1)-th digit as 1 when the predetermined value has not been assumed. The thus formed seven digits of binary numerals serve as error determination numbers and indicate an identification number (from 1 to 127 excluding 128) of a bit on which a bit error is occurring. When the error determination number is 0, there is no error from the identification number 1 to the identification number 127.

Next, the parity bit of the remaining identification number 128 is checked to determine if it assumes the above-mentioned predetermined value. When the error determination numbers assume a value other than 0 despite the above parity bit assuming the predetermined value, then, it means that two bit errors are occurring. In this case, however, the locations of the errors are not obvious. Conversely, when the parity bit of the identification number 128 does not assume the predetermined value despite the error determination numbers being 0, it means that an error has occurred in the parity of the identification number 128. Thus, the occurrence and location of the error can be learned for one bit error, and the data can be corrected by inverting the data of the bit at a location where the error is present.

The following highly reliable and high-performance system can be obtained relying upon the arrangement of the embodiment of the invention shown in FIG. 1 and upon the flow chart of the processing for checking and correcting error shown in FIG. 2.

That is, first, even when a soft error has occurred in the area for storing OS and application programs, the occurrence of a serious trouble in the functions of the system can be avoided. This is because the erroneous portion is repaired to recover the functions of the system by giving a command for starting error checking and correcting procedures. Additionally, temporarily stored data remains as nonvolatile data in the work area. So, even when the power source circuit of the system is shut down unexpectedly, it is not a serious problem for the user.

Second, the number of chips used for the system can be decreased and the cost of the system can be decreased compared with the case where the OS and the application programs are stored in the ROM and the work area is constituted by using DRAM. Furthermore, the system can be constituted in a compact size lending itself well for the portable electronic components. Similar advantages are obtained even when compared with a system in which the OS and the application programs are stored in the hard disk when the system is not being used, and are read out into the DRAM from the hard disk when the system is to be used. At the start of the system, furthermore, the OS program is already present in the ferroelectric memory so that it can be accessed at high speed by the CPU. Therefore, the start time can be shortened compared with the case where the OS program is first written into the DRAM from the hard disk which has a slow access.

(c) Third, the operation speed does not decrease unlike the conventional system shown in FIGS. 8A and 8B. This is because, during the ordinary reading operation, the data are not checked, and the parity bit is not newly formed, either, during the ordinary writing operation. This is due to that the parity bits are provided only for the data in the overwrite-inhibited memory block.

(d) Fourth, the processing for checking and correcting error is executed by using the CPU. Since no ECC circuit is mounted, therefore, the chip area does not increase and the cost of the chip does not increase, too.

Figure 3A:
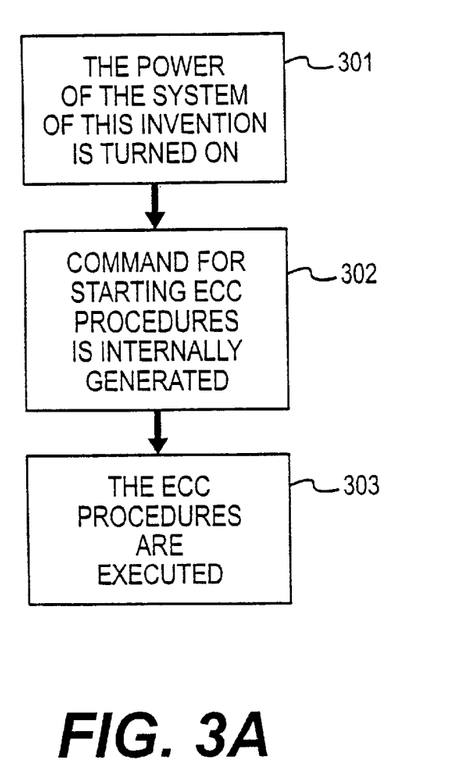
FIGS. 3A and 3B are diagrams illustrating the generating of a command for starting error checking and correcting procedures according to the present invention.
Figure 3B:
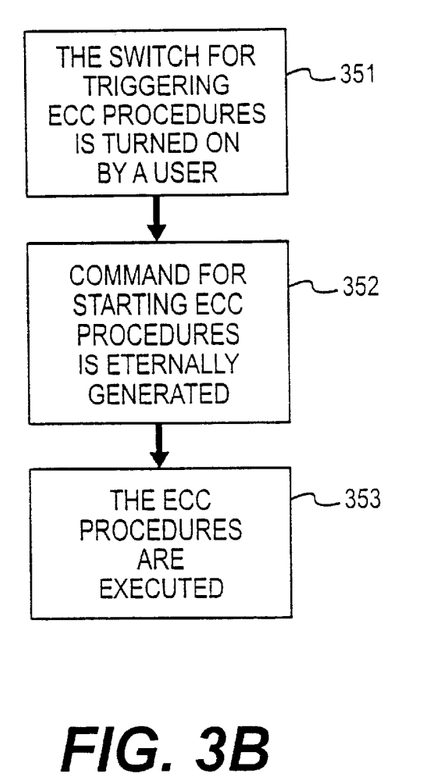

FIGS. 3A and 3B are flow charts illustrating procedures for executing the processes for checking and correcting errors relying upon a method of generating two kinds of commands for starting error checking and correcting procedures, respectively.

Referring to FIG. 3A, a method of executing a processing for checking and correcting error wherein when the power source circuit of the system of the invention is turned on (step 301) is shown. That is, a command for starting error checking and correcting procedures is automatically formed by an internal circuit of the system (step 302), and the CPU executes a program regarding error checking and correcting procedures (step 303) in order to correct error.

According to the method of checking and correcting error as shown in FIG. 3B, on the other hand, a switch is provided in the system of the invention to be turned on by a user (step 351). A command for starting error checking and correcting procedures is formed (step 352) and the CPU executes a program regarding error checking and correcting procedures (step 353).

In both methods, the command for error checking and correcting procedures needs not be frequently given but may be given, for example, once a day. A sufficiently high degree of reliability is maintained by the command which is given at such a frequency as will be obvious from the following calculation.

Semiconductor memories are usually so designed that the frequency of soft error occurrence is not larger than 1000 FIT. This is a ratio in which soft error occurs in a chip, on average, only once in $10^6$ hours. It is now supposed an OS program is stored in the ferroelectric memory chip of 10 million systems used worldwide. According to the conventional systems, in this case, ten systems out of 10 million systems will be effected by a soft error an hour. Here, it is presumed that an error causes the OS program to be out of operation. On the other hand, when the system of the present invention is operated 10 hours a day and when a command for starting ECC procedures is given once a day, the situation will be as described below.

Calculation below is the worst case where the OS program is stored in the whole ferroelectric memory chip. It is presumed that the storage area is constituted by 1000 sets of data storage bits and parity bits. When the parity bits are capable of recovering only one bit errors, the system of the present invention will be shut only when two or more soft errors occur in any one of the above-mentioned 1000 sets at a moment when the command for starting the ECC procedures is given.

When the frequency of soft error occurrence is 1000 FIT, a total of 100 errors occurs in 10 million memory chips during 10 hours. Among them, the probability in that two or more errors may occur in any of 10 million×1000 sets of blocks, is smaller than $10^6$. This is smaller than a frequency in which an error occurs once in $10^6$ days, i.e., in 2740 years. According to the system of the present invention as described above, therefore, the system will be shut down by two or more errors occurring very infrequently at a very small probability. In the embodiment (command for starting ECC procedures is generated upon restarting the power source circuit) shown in FIG. 3A, the command for starting the ECC procedures is automatically formed at a frequency of about once a day and, hence, there is obtained a system which is highly reliable and is easy to use. According to both embodiments shown in FIGS. 3A and 3B, even when the function of the system is halted due to the occurrence of soft error in the storage area of the OS program, the function can be recovered at a probability of almost 100% by restarting the power source circuit or by turning a predetermined switch on by the user. Thus, the system of the invention provides high reliability.

According to the system of the present invention, furthermore, the system does not need to be provided at all times with a nonvolatile medium such as a hard disk for storing the OS program and like programs when the system is not in use, and a compact system can be realized. It is further allowed to shorten the time for starting the system. In either the first method or the second method of FIG. 3, even when an error is found in the overwrite-inhibited memory block, the error is corrected by the CPU. Therefore, the correct OS program needs not be loaded into a ferroelectric memory from a nonvolatile medium (e.g., hard disk) other than the ferroelectric memory.

Figure 4A:
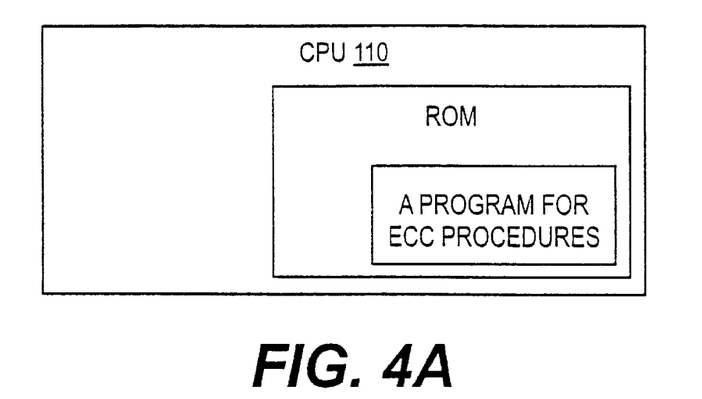
FIGS. 4A and 4B are diagrams illustrating storage areas for storing a program regarding error checking and correcting procedures according to the present invention.
Figure 4B:
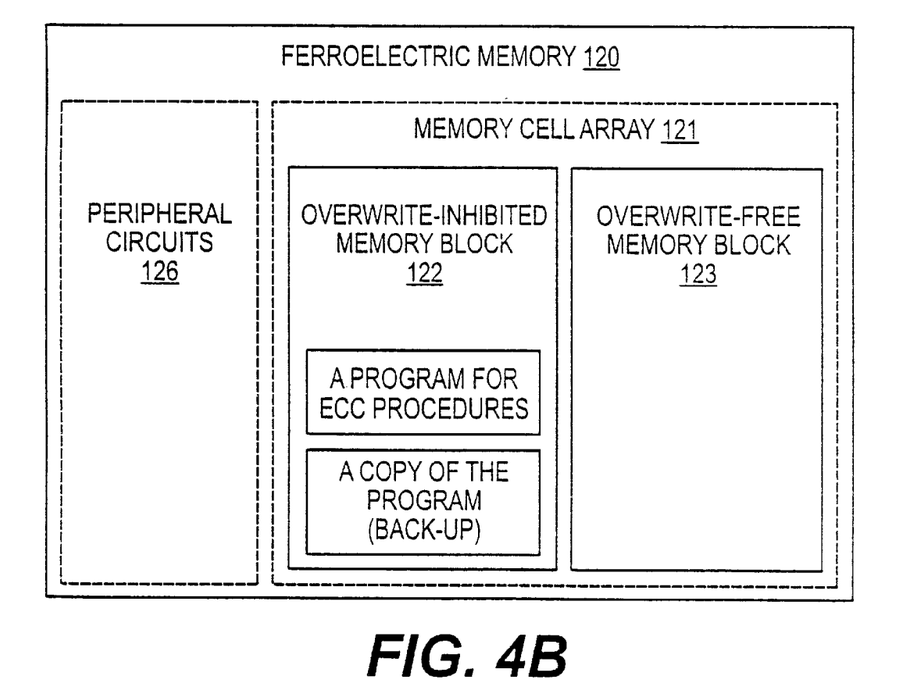

FIGS. 4A and 4B illustrate an embodiment of the storage area 111 for storing a program regarding error checking and correcting procedures of FIG. 1. FIG. 4A is an embodiment in which an area for storing the program regarding error checking and correcting procedures is provided in a portion of the one-chip ROM area in the CPU 110. According to this embodiment which uses the ROM, soft error does not occur in the area for storing the program regarding error checking and correcting procedures, i.e., the error can be checked and corrected making it possible to obtain a highly reliable system. Referring to FIG. 4B, the area for storing the program regarding error checking and correcting procedures is provided in the overwrite-inhibited memory block 122 in the ferroelectric memory 120. In this case, however, soft error may occur in the storage area and, hence, the same program is stored in duplicate for back-up. According to this embodiment, the system can be built using a general-purpose CPU at a decreased cost while maintaining high reliability.

In the above-mentioned embodiments, the area of the overwrite-inhibited memory block is fixed. The area of the block, however, may be changed in response to an instruction.

Figure 5A:
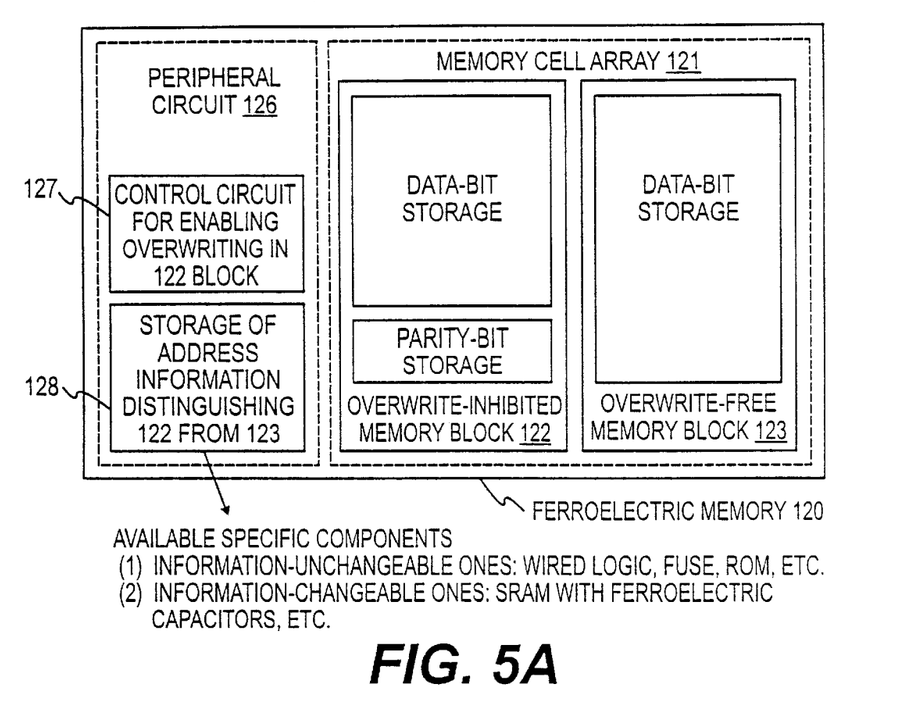
FIGS. 5A and 5B are diagrams illustrating an address storage area for defining the range of the overwrite-inhibited memory block according to the present invention.
Figure 5B:
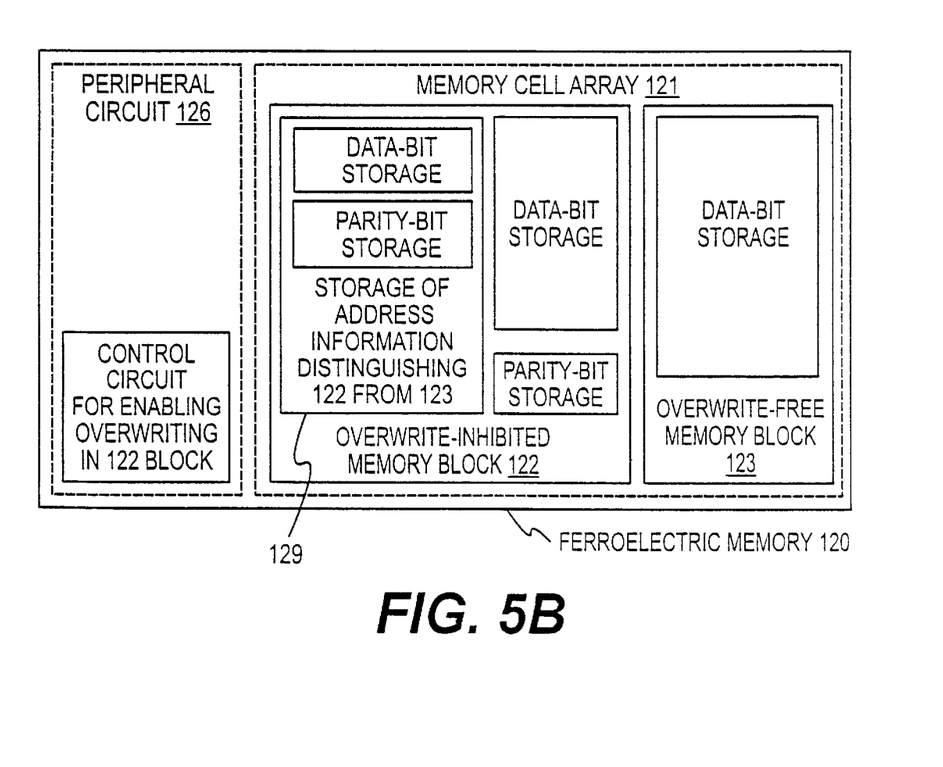

FIGS. 5A and 5B illustrate arrangements of an address storage for instructing the area of the overwrite-inhibited memory block according to the embodiment of the present invention.

In FIG. 5A, the peripheral circuit portion is provided with an address storage 128 for instructing (defining) the area of the overwrite-inhibited memory block (distinguishing block 122 from block 123). This may comprise a wired logic, fuse or ROM to fix the area of the overwrite-inhibited memory block, or may comprise a static RAM (SRAM) with a ferroelectric capacitor to change the area of the overwrite-inhibited memory block.

FIG. 5B illustrates an embodiment in which the overwrite-inhibited memory block 122 is provided with the address storage 129 for instructing (defining) the area of the overwrite-inhibited memory block 122 (distinguishing block 122 from block 123). According to the embodiment of FIG. 5B, the overwrite-inhibited memory block can be easily varied in size.

Figure 6:
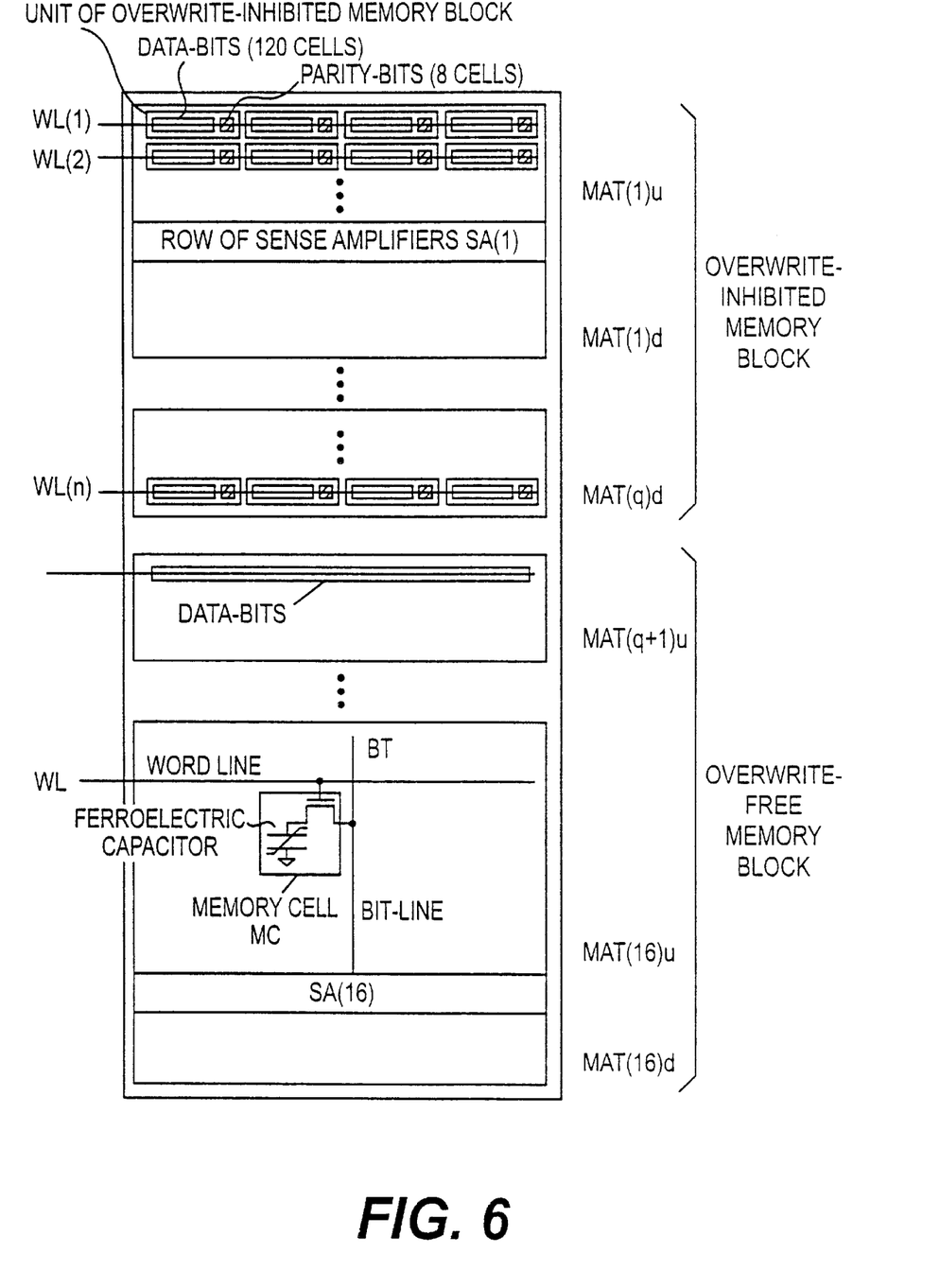
FIG. 6 is a diagram illustrating mats in the ferroelectric memory of the present invention.

FIG. 6 is a diagram of a memory cell array in the system of the present invention, and schematically illustrates only some of the constituent elements. Each memory cell comprises a ferroelectric capacitor and a transistor (in FIG. 6, only one memory cell MC is shown as a representative cell). Each memory cell is disposed at an intersection between a word line WL and a bit line BT. For example, 512 memory cells are connected to a word line WL, 256 memory cells are connected to a pair of bit lines, and a mat is constituted by 512×256 memory cells.

The row of sense amplifiers connected to the pair of bit lines are so arranged as to be shared by two mats; i.e., the row of sense amplifiers (1)s are so arranged as to be shared by the mats 1(u) and 1(d). The overwrite-inhibited memory block and the overwrite-free memory block are defined by a unit of the above two mats. By defining the blocks with the mats as a unit, the control circuit 127 of FIG. 1 can be simplified. The unit of the overwrite-inhibited memory block or a set of the data storage bits and parity bits is defined by a size for equally dividing a word line. In FIG. 6, for example, each set comprises data storage bits of 120 cells and parity bits of 8 cells, and each word line WL(i) has four sets. As a result, the data can be efficiently read out into the CPU at the time of ECC processing.

Figure 7A:
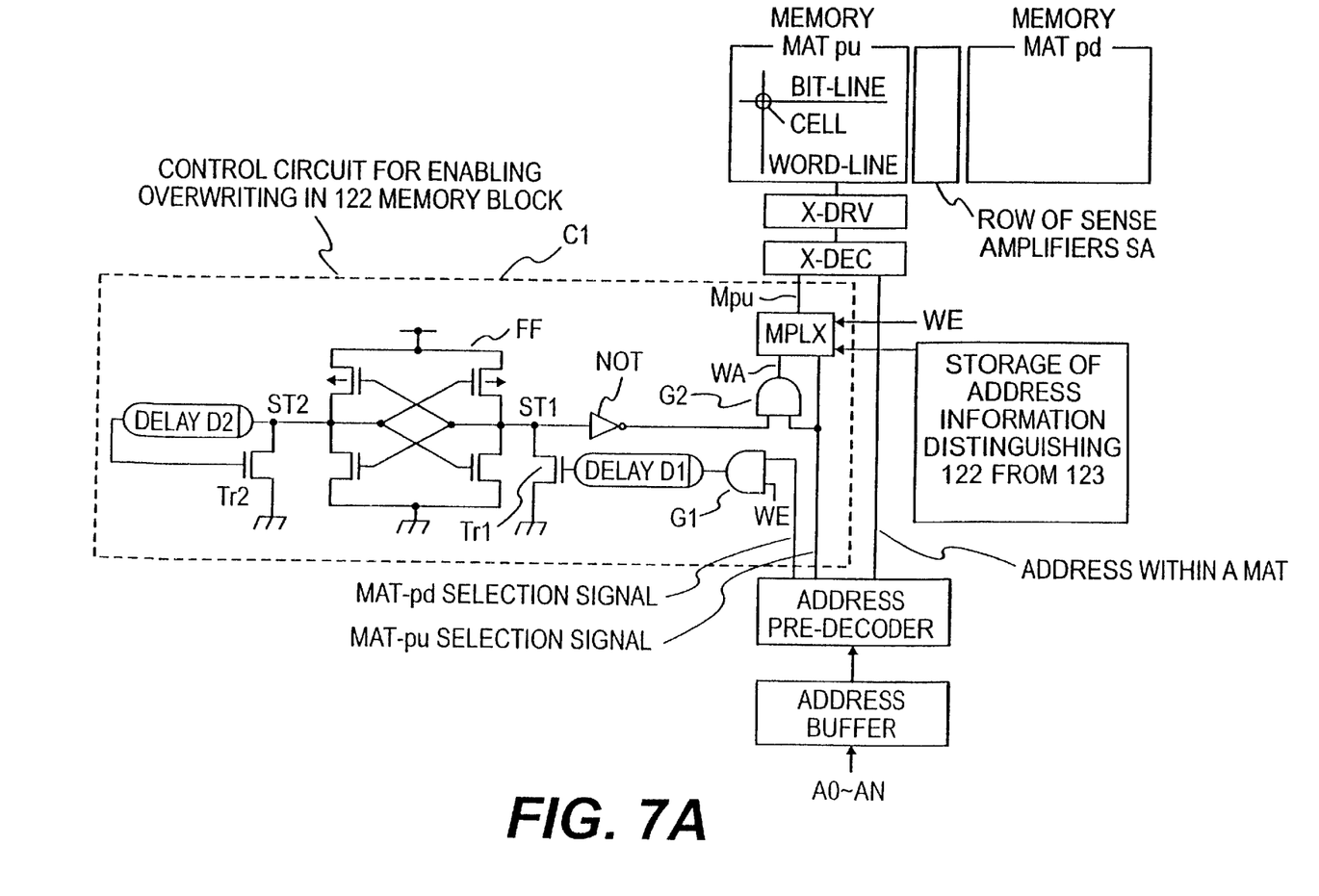
FIGS. 7A and 7B are diagrams of a control circuit for temporarily enabling the data to be written into the overwrite-inhibited memory block and operation waveforms thereof.
Figure 7B:
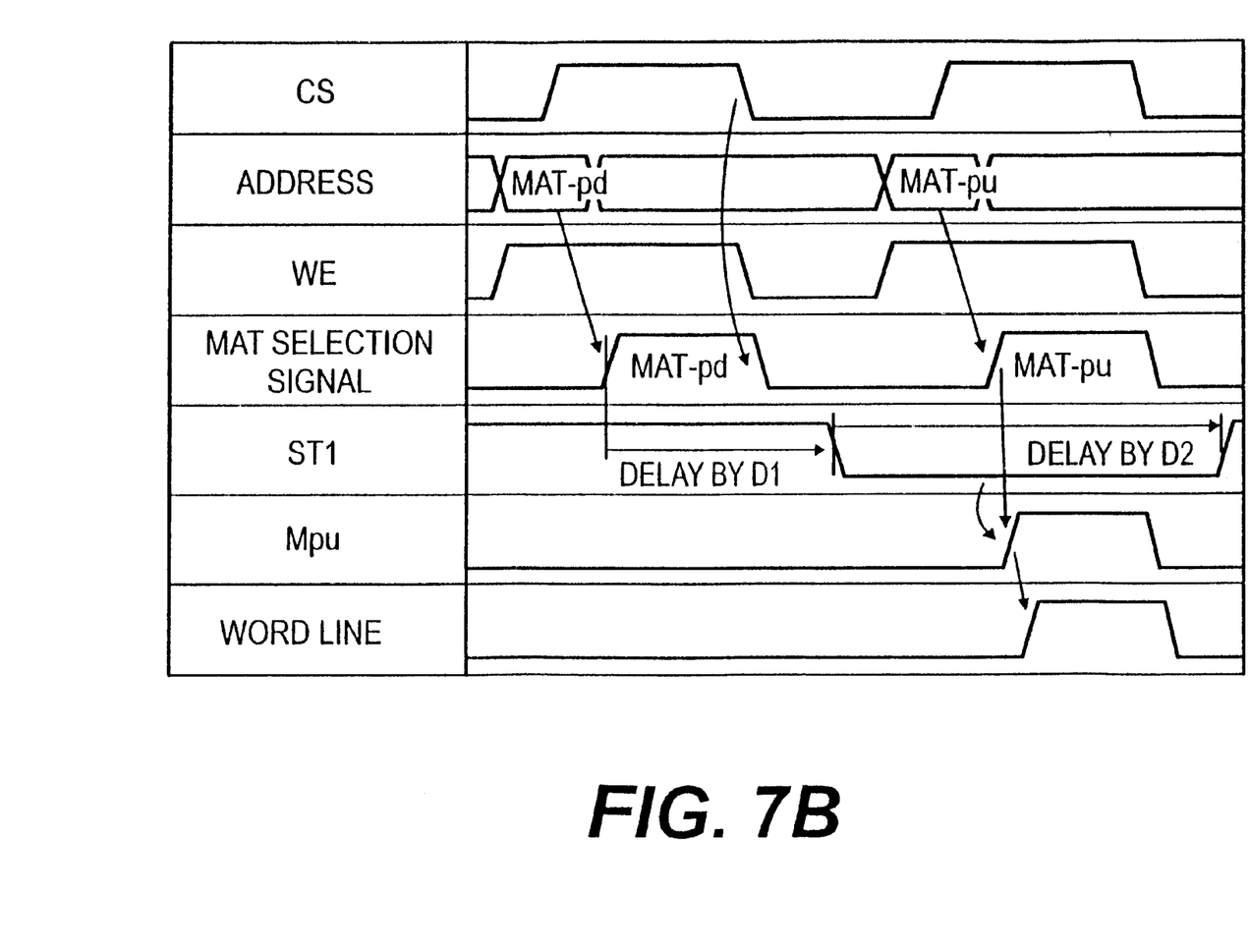

FIGS. 7A and 7B are diagrams illustrating an embodiment of a control circuit 127 for enabling the data to be written into the overwrite-inhibited memory block of FIG. 1, wherein the diagram of FIG. 7A illustrates the control circuit 127 and the diagram of FIG. 7B illustrates the flow of operation.

In writing the data into the memory mat pu, when a write instruction is given to any address of the memory mats pd that are facing each other with the row of sense amplifiers SA being sandwiched therebetween, the data is enabled to be written into the other memory mat pu for only a predetermined period of time defined by delay circuits D1 and D2. A write instruction for the first memory mat pd is not accepted at this time.

In FIG. 7A, the control circuit 127 is constituted by a flip-flop circuit FF, two transistors TR1 and TR2, two delay circuits D1 and D2, two AND circuits G1 and G2, a NOT circuit NOT and a multiplexer MPLX. Usually, one node ST1 of the flip-flop circuit FF assumes the high level, and the high-level signal is inverted through the NOT circuit NOT to close the AND circuit G2. Therefore, WA from the AND circuit G2 and Mpu from the multiplexer MPLX both assume the low level, placing the memory mat pu in the overwrite-inhibited state.

When a write instruction (write enable signal WE of the high level) is given to the memory mat pd, the addresses A0 to AN that are input to, and held by, the address buffer are decoded by the address predecoder to form a mat pd selection signal, a mat pu selection and a selection signal in a mat. The mat pd selection signal is input to the AND circuit G1. When the write enable signal WE has the high level, the transistor TR1 is turned on by the output of the AND circuit G1 after a predetermined period of time by the delay circuit D1, and one node St1 of the flip-flop circuit FF assumes the low level. The low-level signal is inverted through the NOT circuit NOT and opens the AND circuit G2. The mat pu selection signal from the address predecoder can be output as WA, that means that mat pu is placed in the overwrite-free state.

The multiplexer MPLX selects either one of mat pu selection signal or WA, and outputs it as Mpu.

When the write enable signal WE has the low level, i.e., in the reading operation, the mat pu selection signal is output as Mpu which activates any word line in the mat pu through an X-decoder X-DEC and an X-driver X-DRV.

When the write enable signal WE has the high level, i.e., in the writing operation, the mat pu selection signal is output as Mpu as far as the mat is the overwrite-free memory block.

When the mat is the overwrite-inhibited memory block, WA is output as Mpu. Whether the mat is the overwrite-free memory block or the overwrite-inhibited memory block is determined depending upon the data stored in the storage unit of the overwrite-inhibited mat.

When one node ST1 of the flip-flop circuit FF assumes the low level, the other node ST2 of the flip-flop FF assumes the high level. Then, after the passage of a predetermined period of delay time determined by the delay circuit D2, the transistor TR2 is turned on and ST2 assumes the low level. Then, ST1 assumes the high level again.

FIG. 7B is a timing chart of the signals during the writing operation when the amt pu is in the overwrite-inhibited memory block.

In FIG. 7A, the transistor Tr1 is usually turned off. Therefore, one node ST1 of the flip-flop FF assumes the high level. After having passed through the NOT circuit NOT, therefore, the output WA of the AND circuit G2 assumes the low level at all times. In the overwrite-inhibited memory block, the output Mpu of the multiplexer MPLX is in agreement with WA (which, in this case, is of the low level) when the write enable signal WE has the high level. Therefore, the mat pu is not selected when a write instruction is issued.

When a write instruction (write enables signal WE having the high level) for an address in the mat pd is generated along with a chip selection signal CS, the mat pd selection signal assumes the high level. As a result, after a delay time due to the delay circuit D1, the transistor Tr1 is turned on and one node ST1 of the flip-flop FF changes into the low level. In this state, the AND circuit G2 is turned on, and the output WA comes into agreement with the mat pu selection signal. When a write instruction (write enable signal WE having the high level) is given to the mat pu, the output Mpu of the multiplexer MPLX comes into agreement with the mat pu selection signal and assumes the high level. This activates a word line that corresponds to a selection signal in the mat from the address predecoder and the writing operation is executed.

The data may be enabled to be written into the mat pd by symmetrically giving a write instruction to the mat pu.

According to the embodiment shown in FIG. 7, there is realized a highly reliable system as follows. The overwrite-inhibited memory block could be defined from the software side by using a program. According to this embodiment which controls the overwrite-inhibited memory block by a circuit, however, it is allowed to greatly decrease the probability of erroneously writing the data into the overwrite-inhibited memory block during the ordinary operation. Furthermore, since a signal is used for a set of two adjacent mats, the control circuit 127 can be arranged close to each set of the mats.

According to the system including a ferroelectric memory of the present invention, it is possible to decrease the probability in which the function of the system is impaired by an erroneous operation of the ferroelectric memory and to realize a highly reliable system. The invention further enables the number of memory chips of the system to be decreased making it possible to realize a compact system at a reduced cost. And, compared to the case of using an ECC circuit in the chip, furthermore, the operation speed does not decrease, the chip area does not increase, and there is no associated increase in the cost.

When a command for starting the ECC procedures is generated in a manner as contemplated by the present invention, furthermore, a highly reliable system that is easy to use can be realized.

When a program regarding ECC procedures is stored in a manner as contemplated by the present invention, furthermore, the probability in which the program regarding ECC procedures itself experiences error is avoided, and a highly reliable system is realized.

When the overwrite-inhibited memory block is set in a manner as contemplated by the present invention, furthermore, the data to be written into the overwrite-inhibited memory block is enabled to realize a system that a easy to use. Moreover, employment of the constitution of the overwrite-inhibited memory block of the present invention makes it easy to inhibit or enable the writing.

By employing the control circuit which enables the writing into the overwrite-inhibited memory block as contemplated by the present invention, furthermore, the probability of erroneously writing the data into the overwrite-inhibited memory block is low, and a highly reliable system is obtained. Moreover, the control circuit can be easily arranged for each of the memory mats.

We claim:

1. A system comprising:
    a first memory block including a plurality of memory cells, each having a ferroelectric capacitor and a field-effect transistor; and
    a CPU coupled to said first memory block,
    wherein said first memory block having a first area for storing ordinary data and a second area for storing additional data for error correction of the ordinary data,
    wherein said system has a first mode and a second mode,
    wherein in the first mode, said CPU accesses the ordinary data without performing an error-checking and correction procedure for the ordinary data using the additional data and a write ordinary to said first memory block is inhibited, and
    wherein in said second mode, a write operation to said first memory block is allowed and said system performs a procedure having an error-checking for the ordinary data using the additional data and a writing back a corrected data into the first memory block when an error is detected by the error-checking.

2. A system according to claim 1, wherein the procedure is performed by said CPU based upon a program data.

3. A system according to claim 1, wherein said system performs the procedure when a trigger signal is generated in said system according to an event.

4. A system according to claim 1, wherein in the second mode, a memory cell to which said corrected data is written back is identical to a memory cell from which the data, identified to be error-bit, has been read out.

5. A system according to claim 1, wherein said system is portable electric component system.

6. A system according to claim 1, wherein each of the said plurality of memory cells stores data based upon the direction of polarization of the ferroelectric capacitor and the data is read out from the corresponding memory cell by detecting its polarization orientation.

7. A system according to claim 1, wherein said first memory block is used as an area for storing an operating system(OS) program of said system.

8. A system according to claim 1, wherein the additional data stored in the second area is parity bits of the ordinary data stored in the first area.

9. A system according to claim 1, further comprising:
    a second memory block coupled to said CPU including a plurality of memory cells, each cell having a ferroelectric capacitor and a field-effect transistor, and wherein said second memory is allowed to read and write both in the first and second modes.

10. A semiconductor device having a first mode and a second mode comprising:
   a first memory block including a plurality of memory cells, each cell having a ferroelectric capacitor and a field-effect transistor;
   a first control circuit for setting said first memory block to an overwrite-inhibited state; and
   a second control circuit for generating a signal indicating an overwrite-free state of said first memory block and for automatically returning the first memory block to the overwrite-inhibited state from the overwrite-free state in the second mode,
   wherein data is enabled to be written into said first memory block in the overwrite-free state in the second mode.

11. A semiconductor device according to claim 10, wherein said first memory block having a first area for storing ordinary data and a second areas for storing additional data for error correction of the ordinary data.

12. A semiconductor device according to claim 11, wherein the second mode is for a procedure having an error-checking of the ordinary data using the additional data and a writing back a corrected data into the first memory block when an error is detected by the error-checking.

13. A semiconductor device according to claim 12, further comprising:
   a second memory block including a plurality of memory cells, each cell having a ferroelectric capacitor and a field-effect transistor, and
   wherein said second memory is allowed to read and write both in the first and second modes.

14. A semiconductor device according to claim 10, further comprising:
   a second memory block including a plurality of memory cells, each cell having a ferroelectric capacitor and a field-effect transistor, and
   wherein said second memory is allowed to read and write both in the first and second modes.

* * * * *